(12) United States Patent
Sindambiwe et al.

(10) Patent No.: US 7,464,022 B2
(45) Date of Patent: Dec. 9, 2008

(54) WORD PROCESSING WITH ARTIFICIAL LANGUAGE VALIDATION

(75) Inventors: Eugene Sindambiwe, Eppelheim (DE); Manfred Schneider, Nussloch (DE)

(73) Assignee: SAP AG, Walldorf (DE)

( * ) Notice: Subject to any disclaimer, the term of this patent is extended or adjusted under 35 U.S.C. 154(b) by 660 days.

(21) Appl. No.: 10/850,572

(22) Filed: May 19, 2004

(65) Prior Publication Data

US 2005/0262443 A1 Nov. 24, 2005

(51) Int. Cl.
*G06F 17/20* (2006.01)
(52) U.S. Cl. .............................. 704/8; 704/9; 704/257; 379/88.01; 715/257
(58) Field of Classification Search ...................... 704/4, 704/7, 8, 9, 10, 251, 257, 270, 1, 2; 715/533, 715/257; 707/200; 379/88.01
See application file for complete search history.

(56) References Cited

U.S. PATENT DOCUMENTS 6,085,206 A * 7/2000 Domini et al. .............. 715/257
7,092,496 B1 * 8/2006 Maes et al. ............... 379/88.01
7,197,515 B2 * 3/2007 Rivers-Moore et al. ..... 707/200

OTHER PUBLICATIONS

"About Microsoft Word" Microsoft Word 2000 (9.0 3821 SR-1), Copyright © 1983-1999 Microsoft Corporation.
About the Microsoft Office 2000 Proofing Tools (1 page).
LaTeX3 Project Team, "LaTeX 2ε for authors", Jul. 31, 2001 (33 pages).

* cited by examiner

*Primary Examiner*—Huyen X. Vo
(74) *Attorney, Agent, or Firm*—Finnegan, Henderson, Farabow, Garrett & Dunner, L.L.P.

(57) ABSTRACT

Methods and apparatus, including computer program products, implementing techniques for word processing. The techniques include receiving a word processing document that includes natural language text, identifying in the word processing document a segment of artificial language text that is written in a particular artificial language, performing one or more word processing functions on the natural language text, and validating the artificial language text using one or more validation functions that are specific to the particular artificial language. The artificial language is a language that has a formal definition. The word processing functions including proofreading the natural language text for spelling, grammar, or style errors.

15 Claims, 2 Drawing Sheets

WORD PROCESSING WITH ARTIFICIAL LANGUAGE VALIDATION

BACKGROUND

The present invention relates to data processing by digital computer, and more particularly to word processing.

Word processing systems (also referred to as word processors) allow users to create documents, primarily textual documents that might otherwise be prepared on a typewriter. Users can also edit, print or save the documents using the word processor. Such documents will be referred to as word processing documents.

Modern word processors offer a greater range of functions than the first such programs. For example, most word processors today can check a word processing document for spelling, grammar, or style errors. Some word processors can even perform this check in different languages. For example, if the document contains a portion in English and another portion in German, the word processor can use an English dictionary to check the spelling for the English portion and a German dictionary to check the spelling for the German portion.

In this specification, languages like English or German, that is, languages normally used by humans to communicate with other humans, will be referred to as natural languages, to distinguish them from the artificial languages normally used to communicate with computers. An artificial language has a formal definition that allows it to be parsed unambiguously. Artificial languages generally have simpler grammar and a smaller vocabulary than natural languages. Examples of artificial languages include Java, C++, HTML (Hypertext Markup Language), and XML (Extensible Markup Language).

Word processors are typically designed for natural language processing. They are typically not designed for artificial language processing and they generally lack any awareness of artificial languages. Artificial language processing is typically done by programs that are specifically designed for such processing. An example of such a program is an HTML editor, for example, Microsoft FrontPage®, available from Microsoft Corporation of Redmond, Wash.

SUMMARY OF THE INVENTION

The present invention provides methods and apparatus, including computer program products, implementing techniques for word processing.

In one aspect, the techniques include receiving a word processing document that includes natural language text, identifying in the word processing document a segment of artificial language text that is written in a particular artificial language, performing one or more word processing functions on the natural language text, and validating the artificial language text using one or more validation functions that are specific to the particular artificial language. The artificial language is a language that has a formal definition. The word processing functions including proofreading the natural language text for spelling, grammar, or style errors.

Implementations of the invention can include one or more of the following features:

Validating the artificial language text includes determining whether the artificial language text conforms to the formal definition of the particular artificial language.

Determining whether the artificial language text conforms to the formal definition of the particular artificial language includes parsing the artificial language text. Determining whether the artificial language text conforms to the formal definition of the particular artificial language includes interpreting, compiling, or executing the artificial language text.

The techniques further include inhibiting at least one of the word processing functions from being performed on the artificial language text. The word processing function that is inhibited is the proofreading function.

The particular artificial language is XML and validating the artificial language text includes checking the artificial language text for compliance with an XML schema that is associated with the artificial language text.

The document includes property information associated with segments of the text and the segment of artificial language text is associated with a property that identifies the particular artificial language that the artificial language text is written in.

The invention can be implemented to realize one or more of the following advantages:

The techniques provided by the invention can be used to implement a word processor capable of performing artificial language validation on portions of a word processing document that the word processor has identified as being artificial language text. This reduces the amount of error in the document.

The word processor does not need to invoke a separate artificial language text editor, or other external mechanism, in order to provide this functionality. The functionality can be built into the word processor.

Such a word processor is more convenient for users. Users do not need to switch between a word processor and an artificial language text editor in order to validate the artificial language text. Instead, they can use a single program to process the entire document, even if the document contains both natural language text and artificial language text.

The word processor can represent the entire document as a single file rather than as two or more files (one of which is embedded in or linked to the other). This improves data consistency and eliminates the contra-intuitive boundaries created by embedding or linking files containing different types of text.

One implementation of the invention provides all of the above advantages.

Details of one or more implementations of the invention are set forth in the accompanying drawings and in the description below. Further features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
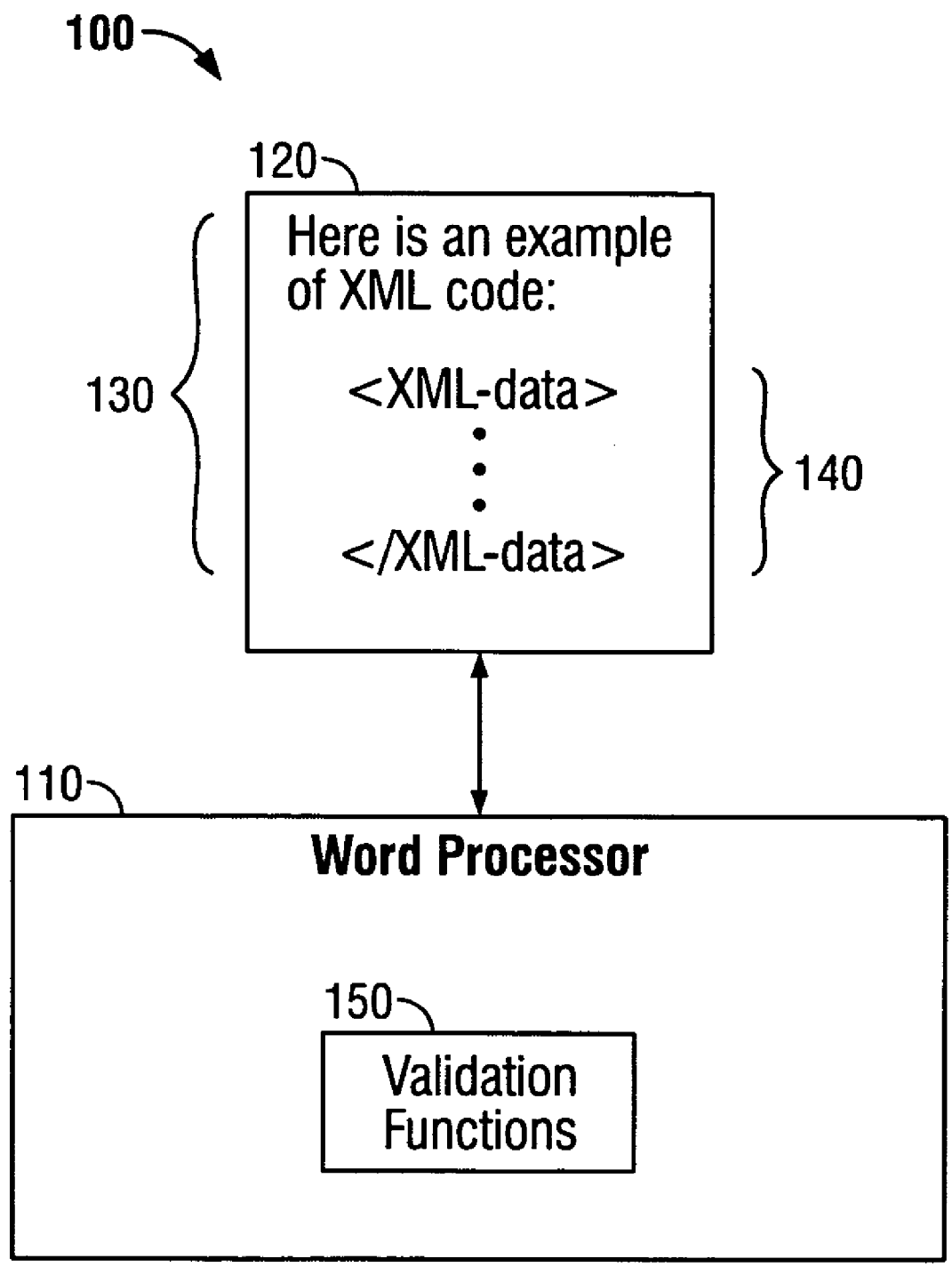
FIG. 1 is a block diagram of a system in accordance with the invention.

As shown in FIG. 1, the system 100 includes a word processor 110 for processing a word processing document 120. The word processing document 120 contains text 130. Optionally, the word processing document 120 can also contain non-textual content, for example, graphics or audio content.

Figure 2:
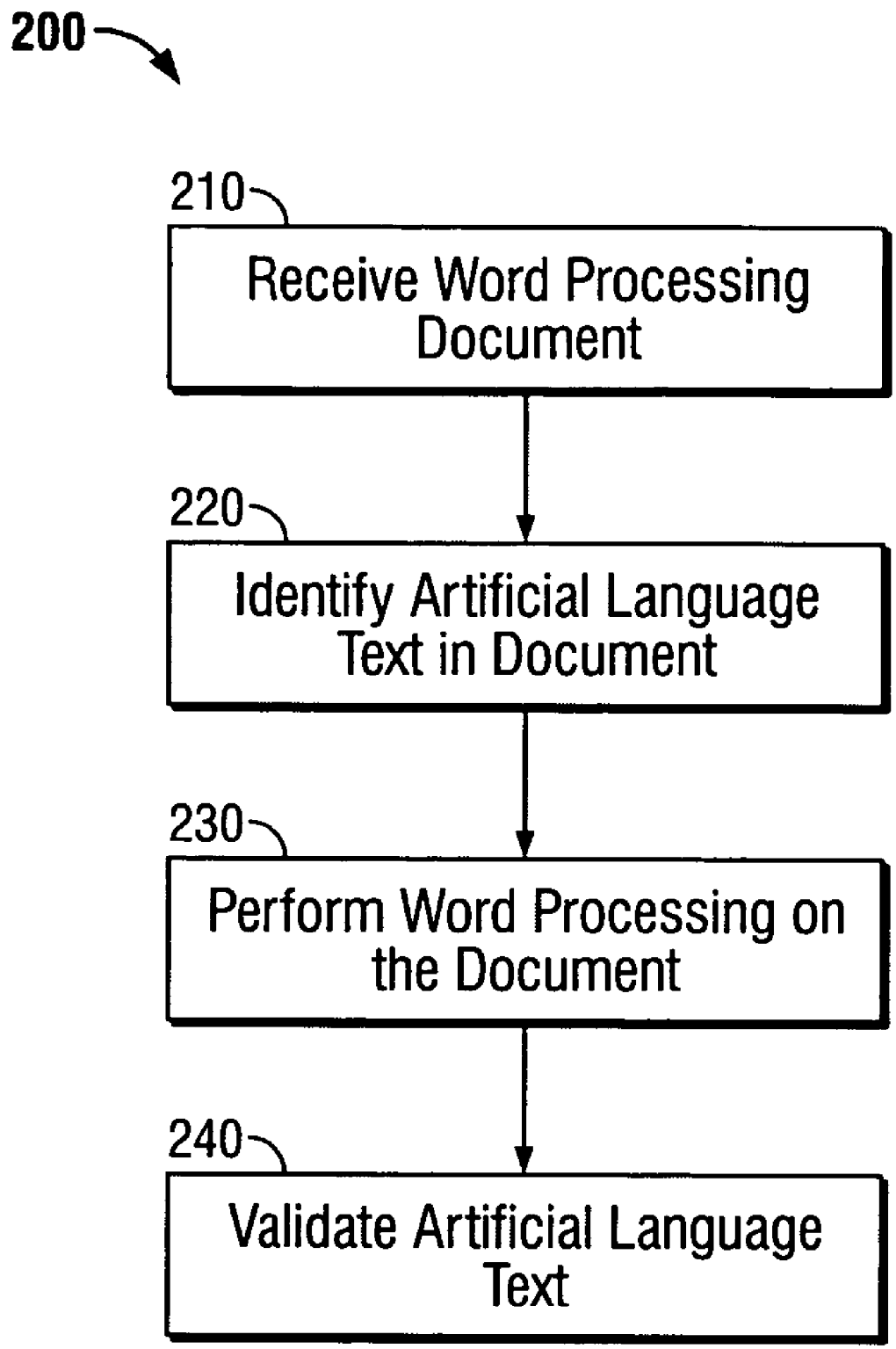
FIG. 2 is a flow diagram of a method in accordance with the invention.

As shown in FIG. 2, the word processor 110 receives the word processing document 120 (step 210) and identifies in the text 130 of the word processing document 120 a segment 140 of text that the word processor 110 identifies as being artificial language text written in a particular artificial language (step 220).

In one implementation, the word processing document 120 includes property information associated with parts of the text 130. The segment of artificial language text 140 is associated with a property that identifies the particular artificial language used in the segment 140 of artificial language text. The word processor 110 uses this property information to identify the particular artificial language in this text segment 140.

Alternatively, the word processor 110 can receive user input that identifies the text segment 140 as artificial language text and identifies the particular artificial language used in the text segment 140.

Alternatively, the word processor 110 can identify the language in the segment 140 of artificial language text by detecting a header string in this text segment 140 that identifies the particular artificial language used in this text segment 140. For example, upon detecting the header string <?xml version="1.0"?>, the word processor 110 could determine that the text segment 140 is written in XML.

The word processor 110 performs one or more word processing functions on the text 130 (step 230). One or more of the word processing functions can be performed in response to user input instructing the word processor 110 to perform the word processing function. The word processing functions including proofreading the text 130 for spelling, grammar, or style errors, and other functions commonly performed for natural languages.

The word processing functions can be performed on any of the text 130, whether natural or artificial language text. In some implementations, however, the word processor 110 can inhibit one or more of the word processing functions from being performed on the text 140 that has been identified as artificial language text. For example, the word processor 110 can treat the property of artificial language text as implying that the text should not be spell-checked.

The word processor 110 validates the artificial language text 140 using one or more validation functions 150 (step 240). One or more of the validation functions can be performed in response to user input instructing the word processor 110 to perform the validation function.

The validation functions are specific to the particular artificial language and generally involve checking the artificial language text segment 140 against the formal definition of the particular artificial language to determine whether the artificial language text segment 140 conforms to the formal definition. Depending on the particular artificial language, this validation check may involve parsing the artificial language text segment 140. It may also involve interpreting, compiling, or executing the artificial language text segment 140.

In one implementation, the validation functions are built into the word processor 110, so the word processor 110 does not need to invoke any external mechanisms in order to provide the validation functions. The validation functions can be provided as part of the word processor 110 or alternatively, they can be provided as part of a plug-in module that can be installed in the word processor 110 to extend the functionality of the word processor 110.

In one implementation, if the particular artificial language identified is XML, the validation functions include a well-formedness check that checks the syntax of the XML text segment 140 for compliance with the XML specification. This specification was developed by World Wide Web Consortium, and is available at http://www.w3.org/TR/REC-xml/. The well-formedness check can include checking that the XML text segment 140 includes at least one element and checking that this element is properly formed (i.e., that this element has a unique element name and is delimited by a pair of start and end tags), and checking that further elements are nested properly and are also properly formed.

In addition, the validation functions for XML can include a schema validation function that checks the XML text segment 140 for compliance with an XML schema (or Document Type Definition) that is known to and accessible by the word processor 110. Upon identifying XML as being the artificial language, the word processor 110 can retrieve the XML schema based on a schema location identifier in the XML text segment 140 that identifies the XML schema. This schema location identifier can be, for example, a URL (uniform resource locator) that specifies the location of the XML schema file. If no XML schema is identified, or if the identified XML schema cannot be retrieved—for example, if the identified file is not found—then the word processor 110 can disable the schema validation function so that users cannot trigger this action.

In one implementation, the word processor 110 varies the validation that is performed depending on whether the XML text segment 140 is a complete XML document or not. If the XML text segment 140 is a complete XML document, the word processor 110 performs both the well-formedness check and the schema validation. But if the XML text segment 140 is not a complete document, then only the well-formedness check is performed. The word processor 110 can receive user input specifying whether or not the XML text segment 140 is a complete XML document. This information can also be provided to the word processor 110 as part of the property information associated with the text segment 140.

In one implementation, the word processor 110 is a what-you-see-is-what-you-get ("WYSIWYG") type of word processor. WYSIWYG word processors allow users to view, during editing of a document, a representation of the way the document will appear when printed. In other words, when a user enters a particular editing command, a WYSIWYG word processor automatically shows the end result of applying the particular editing command to document. Non-WYSIWYG word processors typically do not provide this kind of immediate visual feedback. Instead, a non-WYSIWYG word processor typically shows the document with markings indicating the particular editing commands to be applied. To view the end result of applying these commands, the user must instruct the word processor to compile the editing commands and display the end result.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described herein, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component (e.g., a data server), a middleware component (e.g., an application server), or a front-end component (e.g., a client computer having a graphical user interface or a Web browser through which a user can interact with an implementation of the invention), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments, but other embodiments can be implemented and are within the scope of the following claims. For example, the operations of the invention can be performed in a different order and still achieve desirable results. Also, in certain implementations, multitasking and parallel processing may be preferable. Other embodiments are within the scope of the following claims

What is claimed is:

1. A computer-readable storage device storing a computer program comprising instructions which, when executed by a processor, executes an image processing method, the image processing method comprising:
   receiving a word processing document that includes natural language text written in a particular human language and artificial language text that is written in a particular artificial language, the particular artificial language being the Extensible Markup Language (XML);
   identifying in the word processing document a segment of the artificial language text that is written in the particular artificial language;
   performing one or more word processing functions on the natural language text, the word processing functions including proofreading the natural language text for spelling, grammar, or style errors; and
   validating the artificial language text using one or more validation functions that are specific to the particular artificial language, the validation including checking the artificial language text for compliance with an XML schema that is associated with the artificial language text.

2. The storage device of claim 1, wherein validating the artificial language text includes determining whether the artificial language text conforms to the formal definition of the particular artificial language.

3. The storage device of claim 2, wherein determining whether the artificial language text conforms to the formal definition of the particular artificial language includes parsing the artificial language text.

4. The storage device of claim 2, wherein determining whether the artificial language text conforms to the formal definition of the particular artificial language includes interpreting, compiling, or executing the artificial language text.

5. The storage device of claim 1, wherein the method further comprises inhibiting at least one of the word processing functions from being performed on the artificial language text.

6. The storage device of claim 5, wherein the word processing function that is inhibited is the proofreading function.

7. The storage device of claim 1, wherein the document includes property information associated with segments of the text and the segment of artificial language text is associated with a property that identifies the particular artificial language that the artificial language text is written in.

8. An apparatus comprising:
   means for receiving a word processing document that includes natural language text written in a particular human language and artificial language text that is written in a particular artificial language, the particular artificial language being the Extensible Markup Language (XML);
   means for identifying in the word processing document a segment of the artificial language text that is written in the particular artificial language;
   means for performing one or more word processing functions on the natural language text, the word processing functions including proofreading the natural language text for spelling, grammar, or style errors; and
   means for validating the artificial language text using one or more validation functions that are specific to the particular artificial language, the validation including checking the artificial language text for compliance with an XML schema that is associated with the artificial language text.

9. The apparatus of claim 8, wherein the means for validating the artificial language text includes means for determining whether the artificial language text conforms to the formal definition of the particular artificial language.

10. The apparatus of claim 9, wherein the means for determining whether the artificial language text conforms to the formal definition of the particular artificial language includes means for parsing the artificial language text.

11. The apparatus of claim 9, wherein the means for determining whether the artificial language text conforms to the formal definition of the particular artificial language includes means for interpreting, compiling, or executing the artificial language text.

12. The apparatus of claim 8, further comprising means for inhibiting at least one of the word processing functions from being performed on the artificial language text.

13. The apparatus of claim 12, wherein the word processing function that is inhibited is the proofreading function.

14. The apparatus of claim 8, wherein the document includes property information associated with segments of the text and the segment of artificial language text is associated with a property that identifies the particular artificial language that the artificial language text is written in.

15. A method comprising:
  receiving a word processing document that includes natural language text written in a particular human language and artificial language text that is written in a particular artificial language, the particular artificial language being the Extensible Markup Language (XML);
  identifying in the word processing document a segment of the artificial language text that is written in the particular artificial language;
  performing one or more word processing functions on the natural language text, the word processing functions including proofreading the natural language text for spelling, grammar, or style errors; and
  validating the artificial language text using one or more validation functions that are specific to the particular artificial language, the validation including checking the artificial language text for compliance with an XML schema that is associated with the artificial language text.

* * * * *